US012624170B2

(12) United States Patent
Choi et al.

(10) Patent No.: US 12,624,170 B2
(45) Date of Patent: May 12, 2026

(54) POLYLACTATE STEREOCOMPLEX AND PREPARATION METHOD THEREOF

(71) Applicant: LG CHEM, LTD., Seoul (KR)

(72) Inventors: Jung Yun Choi, Daejeon (KR); Banseok Choi, Daejeon (KR); Chul Woong Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 658 days.

(21) Appl. No.: 17/913,952

(22) PCT Filed: Sep. 7, 2021

(86) PCT No.: PCT/KR2021/012104
§ 371 (c)(1),
(2) Date: Sep. 23, 2022

(87) PCT Pub. No.: WO2022/050815
PCT Pub. Date: Mar. 10, 2022

(65) Prior Publication Data

US 2023/0123848 A1 Apr. 20, 2023

(30) Foreign Application Priority Data

Sep. 7, 2020 (KR) ........................ 10-2020-0113936
Sep. 6, 2021 (KR) ........................ 10-2021-0118336

(51) Int. Cl.
*C08G 81/00* (2006.01)

(52) U.S. Cl.
CPC ......... *C08G 81/00* (2013.01); *C08G 2230/00* (2013.01)

(58) Field of Classification Search
CPC .... C08G 81/00; C08G 2230/00; C08G 63/08; C08L 87/005; C08L 67/04; Y02W 90/10
See application file for complete search history.

(56) References Cited

U.S. PATENT DOCUMENTS

2012/0238652 A1 9/2012 Uehara et al.
2013/0331493 A1 12/2013 Yamamura et al.
2014/0378595 A1 12/2014 Kim et al.
2015/0057385 A1 2/2015 Hong et al.
2018/0251593 A1* 9/2018 Kol ...................... C08G 63/823
2020/0270649 A1 8/2020 Kang et al.
2021/0309800 A1 10/2021 Choi et al.
2021/0340314 A1* 11/2021 Choi .................. C08G 63/6852
2022/0259383 A1 8/2022 Choi et al.

FOREIGN PATENT DOCUMENTS

| | | |
|---|---|---|
| CN | 103073708 | 5/2013 |
| JP | 2003096285 | 4/2003 |
| JP | 2006-036808 | 2/2006 |
| JP | 2006299133 | 11/2006 |
| JP | 2008-037996 | 2/2008 |
| JP | 2008-115503 | 5/2008 |
| JP | 2010180374 | 8/2010 |
| JP | 2016138239 | 8/2016 |
| JP | 2016210894 | 12/2016 |
| KR | 10-2013-0022556 | 3/2013 |
| KR | 10-2013-0130397 | 12/2013 |
| KR | 10-2014-0007859 | 1/2014 |
| KR | 10-2014-0147306 | 12/2014 |
| KR | 10-2019-0078387 | 7/2019 |
| KR | 10-2019-0108892 | 9/2019 |
| WO | 2020-118303 | 6/2020 |

OTHER PUBLICATIONS

Machine Translation of JP 2003-096285 (Year: 2003).*
Andressen AEM article (Year: 2014).*
Nakayama IJMS lactic acid-propiolactone copolymer article (Year: 2017).*
Wang ACS Macro Letters propiolactone block copolymer article (Year: 2013).*
Ramier et al., "Microwave-Assisted Synthesis and Characterization of Biodegradable Block Copolyesters Based on Poly(3-hydroxyalkanoate)s and Poly(D,L-lactide)," Journal of Polymer Science Part A: Polymer Chemistry 50:1445-1455 (2012).
Jang et al., "Characteristics of Preparation and Thermal Properties of PLA Stereocomplex," Applied Chemistry 14(1):1-4 (2010). English Language Abstract and original document in Korean included.

* cited by examiner

*Primary Examiner* — Heidi R Kelley
*Assistant Examiner* — Adam J Berro
(74) *Attorney, Agent, or Firm* — Bryan Cave Leighton Paisner LLP

(57) ABSTRACT

Provided are a polylactate stereocomplex exhibiting excellent heat resistance and remarkably improved elongation characteristics while maintaining biodegradability, and a preparation method thereof.

10 Claims, No Drawings

POLYLACTATE STEREOCOMPLEX AND PREPARATION METHOD THEREOF

CROSS-REFERENCE TO RELATED APPLICATIONS s

This application is a National Stage Application of International Application No. PCT/KR2021/012104 filed on Sep. 7, 2021, which claims priority to and the benefits of Korean Patent Application No. 10-2020-0113936, filed Sep. 7, 2020, and Korean Patent Application No. 10-2021-0118336, filed on Sep. 6, 2021, the disclosures of which are hereby incorporated by reference herein in their entirety.

TECHNICAL FIELD

The present invention relates to a polylactate stereocomplex including a poly(L-lactate-3-hydroxypropionate) block copolymer, and a preparation method thereof.

BACKGROUND

Polylactate (polylactide or polylactic acid) resin is a plant-derived resin obtained from plants such as corn, etc., and is attracting attention as an environment-friendly material having excellent tensile strength and elastic modulus while having biodegradable properties. Specifically, unlike petroleum-based resins such as polystyrene resin, polyvinyl chloride (PVC) resin, polyethylene, etc., which are currently used, polylactate resin has effects of preventing the depletion of petroleum resources, suppressing carbon dioxide emissions, etc., and thus it can reduce environmental pollution, which is a drawback of petroleum-based plastic products. Therefore, as the problem of environmental pollution caused by waste plastic, etc. has emerged as a social problem, it has been attempted to expand the scope of application to the fields of the products where general plastics (petroleum-based resins) were used, such as food packaging materials and containers, electronic product cases, etc.

However, the polylactate resin has low impact resistance and heat resistance, as compared with existing petroleum-based resins, and thus its application range is limited. Further, the polylactate resin has poor elongation characteristics and easily exhibits brittleness, which limits its use as a general-purpose resin.

Accordingly, to enhance the elongation characteristics of the polylactate resin, a method of compounding an additive or forming a copolymer with a functional monomer, or to enhance heat resistance, a method of adding a nucleating agent or an inorganic additive, etc. has been proposed. However, the additives used in these methods have a problem in that most of them are not biodegradable.

Accordingly, it is required to develop a material exhibiting improved heat resistance and elongation characteristics while maintaining biodegradability.

BRIEF DESCRIPTION

Technical Problem

Provided are a polylactate stereocomplex having improved heat resistance and elongation characteristics while maintaining biodegradability, and a preparation method thereof.

Technical Solution

According to one aspect of the present invention, provided is a polylactate stereocomplex including:

- a poly(L-lactate-3-hydroxypropionate) block copolymer including 10 parts by weight to 50 parts by weight of a poly(3-hydroxypropionate) repeating unit with respect to 100 parts by weight of a poly(L-lactate) repeating unit; and
- a poly(D-lactate) having a weight average molecular weight of 5,000 g/mol or more to less than 100,000 g/mol.

According to another aspect of the present invention, provided is a method of preparing a polylactate stereocomplex, the method including the step of mixing a poly(L-lactate-3-hydroxypropionate) block copolymer including 10 parts by weight to 50 parts by weight of a poly(3-hydroxypropionate) repeating unit with respect to 100 parts by weight of a poly(L-lactate) repeating unit, and a poly(D-lactate) having a weight average molecular weight of 5,000 g/mol or more to less than 100,000 g/mol.

Effect of the Invention

A polylactate stereocomplex of the present invention can have excellent physical properties such as heat resistance, elongation characteristics, etc. while maintaining biodegradability, thereby being suitably used as an eco-friendly general-purpose resin.

DETAILED DESCRIPTION

The terms used in this description are just for explaining exemplary embodiments and it is not intended to restrict the present invention. The singular expression can include the plural expression unless it is differently expressed contextually. It must be understood that the term "include", "equip", or "have" in the present description is only used for designating the existence of characteristics taken effect, steps, components, or combinations thereof, and do not exclude the existence or the possibility of addition of one or more different characteristics, steps, components or combinations thereof beforehand.

The present invention can be variously modified and have various forms, and specific examples will be illustrated and explained in detail below. However, it is not intended to limit the present invention to the specific examples and it must be understood that the present invention includes every modifications, equivalents, or replacements included in the spirit and technical scope of the present invention.

As used herein, the "poly(L-lactate-3-hydroxypropionate) block copolymer" refers to a block copolymer including a poly(L-lactate) repeating unit derived from an L-lactic acid monomer and/or an L-lactide monomer and a poly(3-hydroxypropionate) repeating unit derived from a 3-hydroxypropionate monomer, and can be expressed as "P(LLA-3-HP) block copolymer", or "P(LLA-b-3-HP)".

Further, as used herein, the "poly(L-lactate)" is a homopolymer of an L-lactate monomer and/or an L-lactide monomer, and can be expressed as "PLLA", and the "poly(D-lactate)" is a homopolymer of a D-lactic acid monomer and/or a D-lactide monomer, and can be expressed as "PDLA".

Hereinafter, the present invention will be described in detail.

Polylactate Stereocomplex

Polylactate resin has biodegradability and biocompatibility, and thus is used as a representative biodegradable resin.

However, it exhibits low thermal stability and elongation, which limits its use as a general-purpose alternative resin to polyolefin.

Accordingly, the present inventors have continued to study a material having excellent heat resistance and elongation characteristics while maintaining biodegradability, and as a result, they found that a poly(L-lactate hydroxypropionate) block copolymer satisfying 10 parts by weight to 50 parts by weight of a poly(3-hydroxypropionate) repeating unit with respect to 100 parts by weight of a poly(L-lactate) repeating unit is able to form a stereocomplex with poly(D-lactate), and this polylactate stereocomplex has remarkably improved heat resistance and elongation characteristics, as compared with the existing polylactate resins, thereby completing the present invention.

According to one aspect of the present invention, provided is a polylactate stereocomplex including a poly(L-lactate-3-hydroxypropionate) block copolymer including 10 parts by weight to 50 parts by weight of a poly(3-hydroxypropionate) repeating unit with respect to 100 parts by weight of a poly(L-lactate) repeating unit; and a poly(D-lactate) having a weight average molecular weight of 5,000 g/mol or more to less than 100,000 g/mol.

The poly(L-lactate-3-hydroxypropionate) block copolymer can exhibit excellent flexibility and tensile property due to the poly(3-hydroxypropionate) repeating unit, as compared with a poly(L-lactate) homopolymer, while maintaining crystallinity of the poly(L-lactate) repeating unit, thereby forming the stereocomplex with poly(D-lactate).

In other words, the poly(L-lactate) in the poly(L-lactate-3-hydroxypropionate) block copolymer can bind with the poly(D-lactate) like a zipper through an intermolecular bond such as a hydrogen bond, etc., and as a result, the polylactate stereocomplex of the present invention can exhibit excellent thermal stability and elongation characteristics.

To meet the above characteristics, the poly(L-lactate-3-hydroxypropionate) block copolymer of the present invention can preferably include 10 parts by weight or more to 50 parts by weight or less, for example, 10 parts by weight or more, or 20 parts by weight or more, and 50 parts by weight or less, or 45 parts by weight or less, or 40 parts by weight or less of the poly(3-hydroxypropionate) repeating unit with respect to 100 parts by weight of the poly(L-lactate) repeating unit.

When the content of the poly(3-hydroxypropionate) repeating unit is less than 10 parts by weight with respect to 100 parts by weight of the poly(L-lactate) repeating unit, it is difficult to secure the effect of improving physical properties of the polylactate stereocomplex, such as elongation, etc. When the content thereof is 50 parts by weight or more, the formation rate of the stereocomplex with poly(D-lactate) can be greatly reduced.

Meanwhile, the poly(L-lactate-3-hydroxypropionate) block copolymer can have a weight average molecular weight of 10,000 g/mol or more, or 50,000 g/mol or more, or 70,000 g/mol or more, and 400,000 g/mol or less, or 300,000 g/mol or less, or 200,000 g/mol or less, or 130,000 g/mol or less.

When the weight average molecular weight of the poly (L-lactate-3-hydroxypropionate) block copolymer is less than 10,000 g/mol, it is difficult to obtain sufficient strength when the stereocomplex is formed. Further, when the weight average molecular weight of the poly(L-lactate-3-hydroxypropionate) block copolymer is more than 400,000 g/mol, there is a problem in that processing becomes difficult, and thus it is preferable to meet the above range.

Further, the poly(L-lactate-3-hydroxypropionate) block copolymer can have a melting temperature (Tm) of 145° C. or higher, 150° C. or higher, or 160° C. or higher. The melting temperature of the poly(L-lactate-3-hydroxypropionate) block copolymer can be, for example, 180° C. or lower.

The poly(L-lactate-3-hydroxypropionate) block copolymer meeting the content of the poly(3-hydroxypropionate) repeating unit can be prepared by the step of forming the poly(L-lactate) repeating unit and the poly(3-hydroxypropionate) repeating unit by ring-opening polymerization of the L-lactide monomer in the presence of a poly(3-hydroxypropionate) initiator.

At this time, the poly(3-hydroxypropionate) initiator can preferably have a weight average molecular weight of 1,500 g/mol to 50,000 g/mol, 2,000 g/mol to 40,000 g/mol, 4,000 g/mol to 45,000 g/mol, or 5,000 g/mol to 30,000 g/mol in order to allow the block copolymer to exhibit excellent physical properties without deterioration in the polymerization activity.

The poly(L-lactate-3-hydroxypropionate) block copolymer prepared from the poly(3-hydroxypropionate) initiator meeting the above molecular weight range can maintain crystallinity of the poly(L-lactate) repeating unit (block), thereby forming a stereocomplex with the poly(D-lactate).

A method of preparing the poly(L-lactate-3-hydroxypropionate) block copolymer suitable for formation of the polylactate stereocomplex of the present invention will be described in more detail in a description of a method of preparing the polylactate stereocomplex.

The poly(D-lactate) which forms the stereocomplex with the poly(L-lactate-3-hydroxypropionate) block copolymer is a homopolymer of a D-lactic acid monomer and/or a D-lactide monomer, and can have an optical purity of 90% or more, 95% or more, or 98% or more.

The poly(D-lactate) can preferably have a weight average molecular weight of 5,000 g/mol or more, or 7,000 g/mol or more, or 10,000 g/mol or more, or 15,000 g/mol or more, and 100,000 g/mol or less, 70,000 g/mol or less, or 50,000 g/mol or less. When the weight average molecular weight of the poly(D-lactate) is less than 5,000 g/mol, there is a problem in that it is difficult to have sufficient crystallinity. When the weight average molecular weight of the poly(D-lactate) is more than 100,000 g/mol, it is difficult to achieve the effects of the present invention due to remarkable deterioration in the tensile and elongation characteristics of the prepared stereocomplex, and for this reason, it is preferable to meet the above range.

The weight average molecular weights of the poly(3-hydroxypropionate) initiator, the poly(L-lactate-3-hydroxypropionate) block copolymer, and the poly(D-lactate) can be measured by gel permeation chromatography (GPC) as in Examples described below.

The polylactate stereocomplex can include 70 parts by weight to 90 parts by weight of the poly(L-lactate-3-hydroxypropionate) block copolymer; and 10 parts by weight to 30 parts by weight of the poly(D-lactate). As described, when the content of the poly(L-lactate-3-hydroxypropionate) block copolymer is high, mechanical properties of the prepared polylactate stereocomplex can be further improved. More preferably, the polylactate stereocomplex can include 80 parts by weight to 90 parts by weight of the poly(L-lactate-3-hydroxypropionate) block copolymer; and 10 parts by weight to 20 parts by weight of the poly(D-lactate).

The polylactate stereocomplex of the present invention exhibits remarkably improved heat resistance and elongation characteristics, as compared with the existing polylactate resins, because the poly(L-lactate-3-hydroxypropionate) block copolymer and the poly(D-lactate) form the complex, as described.

Specifically, the polylactate stereocomplex can have a melting temperature (Tm) of 200° C. or higher, and 270° C. or lower, 260° C. or lower, 240° C. or lower, or 220° C. or lower.

When the melting temperature is 200° C. or higher, it can be determined that the polylactate stereocomplex has been formed. At this time, as a melting enthalpy is higher, it can be determined that the formation rate of the stereocomplex, i.e., the ratio of each polymer participating in the formation of the stereocomplex is higher. Accordingly, the polylactate stereocomplex according to one embodiment of the present invention can have a melting enthalpy of 11 J/g or more, or 20 J/g or more, and 50 J/g or less, or 45 J/g or less.

The melting temperature and the melting enthalpy can be measured by differential scanning calorimetry.

Meanwhile, the polylactate stereocomplex can have elongation of 30% or more, 45% or more, or 55% or more, as measured in accordance with IPC-TM-650 using a tensile strength tester after preparing a dogbone-shaped test specimen of ASTM D638 Type V, indicating that the polylactate stereocomplex exhibits remarkably excellent elongation, as compared with the existing stereocomplex of poly(L-lactate) and poly(D-lactate). The upper limit of the elongation can be, but is not particularly limited to, for example, 150% or less, or 110% or less.

Methods of measuring the melting temperature, the melting enthalpy, and the elongation characteristics of the polylactate stereocomplex will be described in more detail in Examples below.

Method of Preparing Polylactate Stereocomplex

Meanwhile, according to another aspect of the present invention, provided is a method of preparing the above-described polylactate stereocomplex.

Specifically, the polylactate stereocomplex can be prepared by a preparation method including the step of mixing a poly(L-lactate-3-hydroxypropionate) block copolymer including 10 parts by weight to 50 parts by weight of a poly(3-hydroxypropionate) repeating unit with respect to 100 parts by weight of a poly(L-lactate) repeating unit, and a poly(D-lactate).

Features of the poly(L-lactate-3-hydroxypropionate) block copolymer and the poly(D-lactate) are the same as described above.

Methods of preparing the poly(L-lactate-3-hydroxypropionate) block copolymer and the poly(D-lactate) are not particularly limited, and known methods can be used.

For example, the poly(L-lactate-3-hydroxypropionate) block copolymer can be prepared by the step of forming the poly(L-lactate) repeating unit and poly(3-hydroxypropionate) repeating unit by ring-opening polymerization of the L-lactide monomer in the presence of a poly(3-hydroxypropionate) initiator.

The poly(3-hydroxypropionate) initiator includes a hydroxy group and/or an alkoxy group at the end. Thus, when the poly(3-hydroxypropionate) initiator is added to the ring-opening polymerization reaction of the lactide monomer, the lactide monomer starts to be inserted from the end of the poly(3-hydroxypropionate) initiator, and as a result, the poly(L-lactate-3-hydroxypropionate) block copolymer can be prepared.

Therefore, when the ring-opening polymerization reaction of the lactide monomer is performed in the presence of the poly(3-hydroxypropionate) initiator, the poly(3-hydroxypropionate) serves as a polymerization initiator, and at the same time, is included as a repeating unit in the block copolymer, thereby making it possible to improve mechanical properties of the finally prepared block copolymer, such as flexibility, impact strength, etc. Specifically, since the poly(3-hydroxypropionate) is included in the finally prepared block copolymer, it is possible to lower a glass transition temperature (Tg) of the block copolymer, thereby increasing the flexibility.

In this regard, an input amount of the poly(3-hydroxypropionate) initiator can be selected within an appropriate range in consideration of the content of the repeating unit of poly(3-hydroxypropionate) included in the finally prepared block copolymer and a molar ratio of the hydroxy group and/or alkoxy group of the initiator which is required to initiate the minimum polymerization.

Specifically, in consideration of the minimum content for maintaining crystallinity of the poly(L-lactate) repeating unit of the finally prepared block copolymer while optimizing the flexibility and mechanical properties thereof, and for acting as an initiator of the ring-opening polymerization reaction, the poly(3-hydroxypropionate) initiator can be added in an amount of 10 parts by weight or more, or 20 parts by weight or more, and 50 parts by weight or less, or 40 parts by weight or less with respect to 100 parts by weight of the L-lactide monomer.

The poly(3-hydroxypropionate) initiator can have a weight average molecular weight of 1,500 g/mol to 50,000 g/mol, 2,000 g/mol to 40,000 g/mol, 4,000 g/mol to 45,000 g/mol, or 5,000 g/mol to 30,000 g/mol in order to exhibit excellent physical properties of the block copolymer without deteriorating polymerization activity. When the weight average molecular weight of the poly(3-hydroxypropionate) initiator is less than 1,500 g/mol, the content of poly(3-hydroxypropionate) can be reduced, and when the weight average molecular weight is more than 50,000 g/mol, the polymerization activity can be reduced.

On the other hand, before the ring-opening polymerization step, 3-hydroxypropionate can be subjected to a condensation polymerization to prepare the poly(3-hydroxypropionate) initiator. The reactant including the prepared poly(3-hydroxypropionate) initiator and lactide monomer is dried, and then the dried poly(3-hydroxypropionate) initiator and lactide monomer can be subjected to a ring-opening polymerization to prepare the above-mentioned block copolymer.

As the catalyst used in the ring-opening polymerization, all catalysts generally used in the preparation of polylactate resins by ring-opening polymerization of lactide monomers can be used. For example, the ring-opening polymerization can be performed in the presence of one or more catalysts selected from the group consisting of an organometallic complex catalyst and an organic catalyst.

The organometallic complex catalyst can be used without limitation in its composition, as long as it is generally used for preparing polylactate resins by ring-opening polymerization of lactide monomers. For example, the organometallic complex catalyst can be a catalyst of the following Chemical Formula 1:

[Chemical Formula 1]

$$MA^1_pA^2_{2-p}$$

wherein in Chemical Formula 1, M is Al, Mg, Zn, Ca, Sn, Fe, Y, Sm, Lu, Ti, or Zr, p is an integer of 0 to 2, and $A^1$ and $A^2$ are each independently an alkoxy or carboxyl group.

More specifically, $MA^1_pA^2_{2-p}$ can be tin (II) 2-ethylhexanoate ($Sn(Oct)_2$).

On the other hand, the organic catalyst can be used without limitation in its composition as long as it is generally used for preparing polylactate resins by ring-opening polymerization reaction of lactide monomers. For example, the organic catalyst can be one or more selected from the group consisting of the following 1,5,7-triazabicyclo-[4,4,0]dec-5-ene (TBD), the following 1,8-diazabicyclo[5.4.0]undec-7-ene (DBU), the following 7-methyl-1,5,7-triazabicyclo [4.4.0] dec-5-ene (MTBD), the following 4-dimethylaminopyridine (DMAP), the following 4-(1-pyrrolidinyl)pyridine (PPY), imidazole, triazolium, thiourea, tertiary amine, and creatinine:

TBD

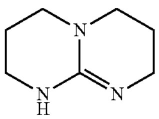

DBU

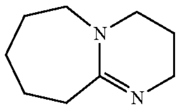

MTBD

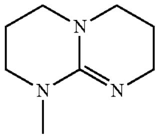

DMAP

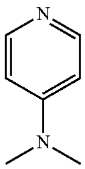

PPY

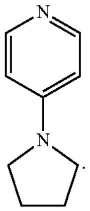

The imidazole can be one or more selected from the group consisting of the following compounds:

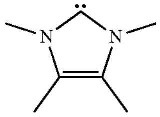

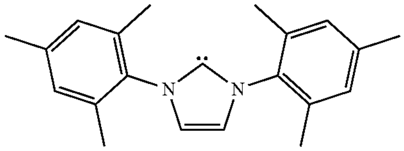

-continued

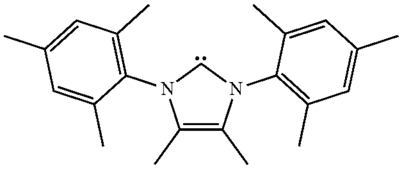

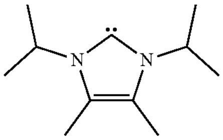

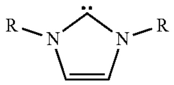

R = $CH_3$
R = $CH(CH_3)$
R = $C(CH_3)_3$
R = adamantyl

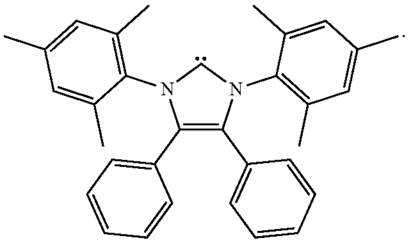

The triazolium can be the following compound:

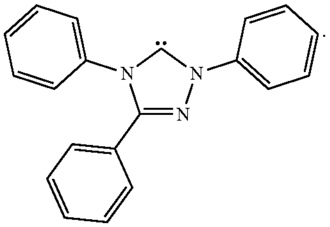

The thiourea can be one or more selected from the group consisting of the following compounds:

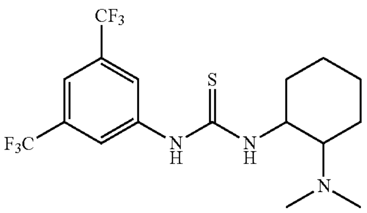

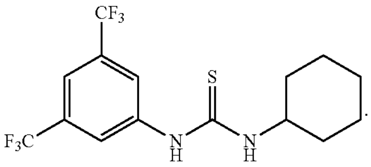

The tertiary amine can be one or more selected from the group consisting of the following compounds:

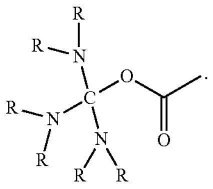

R = $CH_3$
R = $CH(CH_3)$
R = $C(CH_3)_3$
R = adamantyl

When the lactide ring-opening polymerization reaction proceeds in the presence of the above-mentioned catalyst, depolymerization or decomposition of the finally prepared block copolymer can be suppressed, and a poly(L-lactate-3-hydroxypropionate) block copolymer having a higher molecular weight and excellent mechanical properties can be obtained with a higher conversion rate.

In the method of preparing the block copolymer according to an embodiment, the content of the catalyst can be 0.01 mol % to 10 mol %, 0.05 mol % to 8 mol %, 0.07 mol % to 5 mol %, or 0.09 mol % to 3 mol % with respect to 100 mol % of the lactide monomer. When the content of the catalyst is less than 0.01 mol % with respect to 100 mol % of the lactide monomer, polymerization activity may not be sufficient, and when the content of the catalyst is more than 10 mol %, the residual catalyst amount of the prepared poly (L-lactate-3-hydroxypropionate) block copolymer becomes larger, which can lead to decomposition or molecular weight reduction of the copolymer due to depolymerization such as transesterification reaction, etc.

The ring-opening polymerization can be performed at 150° C. to 200° C. for 5 minutes to 10 hours.

Further, the ring-opening polymerization reaction can be performed by bulk polymerization using substantially no solvent. At this time, "using substantially no solvent" can cover the case of using a small amount of a solvent for dissolving the catalyst, for example, the case of using up to less than 1 ml of the solvent per 1 kg of the used lactide monomer. As the ring-opening polymerization proceeds by bulk polymerization, it becomes possible to omit a process of removing the solvent after polymerization, and decomposition or loss of the resin in such a solvent removal process can also be suppressed. In addition, by the bulk polymerization, the poly(L-lactate-3-hydroxypropionate) block copolymer can be obtained with high conversion and yield.

The poly(L-lactate-3-hydroxypropionate) block copolymer prepared as above maintains crystallinity of the poly (L-lactate) repeating unit, thereby forming the polylactate stereocomplex by polymerization with the poly(D-lactate).

Meanwhile, the poly(D-lactate) can be a commercially available product, or can be prepared according to a known synthetic method. In one embodiment, the poly(D-lactate) can be prepared by condensation polymerization of a D-lactic acid monomer in the presence of a catalyst.

Next, the poly(L-lactate-3-hydroxypropionate) block copolymer can be mixed with the poly(D-lactate) to prepare the stereocomplex. At this time, a melt compounding method can be used, and in this case, a molecular weight of the prepared polylactate stereocomplex can be rather reduced. However, the stereocomplex can be formed within a short time, and the formation rate of the complex can be high.

The melt compounding can be performed at a temperature of 140° C. to 200° C., or 150° C. to 200° C., or 170° C. to 200° C. When the temperature during the melt compounding is lower than 140° C., the formation rate of the stereocomplex can be lowered. When the temperature is excessively high by exceeding 200° C., the polymer can be thermally deformed, and thus it is preferable to meet the above-mentioned range. The melt compounding can be performed at atmospheric pressure, i.e., within a pressure range of 700 Torr to 800 Torr. The poly(L-lactate-3-hydroxypropionate) block copolymer and the poly(D-lactate) can be stirred under the above temperature and pressure conditions for 20 minutes or more, or 30 minutes to 1 hour to prepare the polylactate stereocomplex.

Hereinafter, preferred exemplary embodiments will be provided for better understanding of the present invention. However, the following exemplary embodiments are only for illustrating the present invention. It is apparent to those skilled in the art that various changes and modifications are possible within the scope and spirit of the present invention, and it is also obvious that these changes and modifications belong to the accompanying claims.

PREPARATION EXAMPLE

Preparation Example 1-1: Preparation of poly(L-lactate-3-hydroxypropionate) Block Copolymer

(1) Preparation of poly(3-hydroxypropionate) Oligomer 30 g (416 mmol) of 3-hydroxypropionate was dried, and then subjected to condensation polymerization in the presence of 0.012 g of a p-toluene sulfonic acid (p-TSA) catalyst under conditions of a temperature of 110° C. and a reduced pressure of 0.1 Torr for 12 hours to prepare a poly(3-hydroxypropionate) oligomer.

A weight average molecular weight of the prepared poly (3-hydroxypropionate) oligomer (P3HP) was 10,000 g/mol.

(2) Preparation of poly(L-lactate-3-hydroxypropionate) Block Copolymer

In a 100 mL round flask, 100 parts by weight of L-lactide, 10 parts by weight of the poly(3-hydroxypropionate) oligomer prepared in (1), and 0.01 mol % (with respect to 100% by weight of L-lactide) of tin(II) 2-ethylhexanoate were mixed and vacuum-dried at room temperature for 4 hours by sufficiently applying a vacuum.

Thereafter, the flask was placed in an oil bath pre-heated at 130° C., the temperature of which was raised to 180° C., and then a ring-opening polymerization reaction was carried out for 60 minutes to 90 minutes. After the reaction was completed, the reaction product was dissolved in chloroform and then extracted with methanol to recover a P(LLA-b-3HP) copolymer having a weight average molecular weight of 124,000 g/mol.

Preparation Example 1-2: Preparation of poly(L-Lactate-3-Hydroxypropionate) Block Copolymer A P(LLA-b-3HP) copolymer having a weight average molecular weight of 80,000 g/mol was prepared in the same manner as in Preparation Example 1-1, except that 100 parts by weight of L-lactide, 20 parts by weight of poly(3-hydroxypropionate) oligomer, and 0.01 mol % (with respect to 100% by weight of L-lactide) of tin(II) 2-ethylhexanoate were used in (2) of Preparation Example 1-1.

Preparation Example 1-3: Preparation of poly(L-lactate hydroxypropionate) Block Copolymer

(1) Preparation of poly(3-hydroxypropionate) oligomer 30 g (416 mmol) of 3-hydroxypropionate was dried, and then subjected to condensation polymerization in the presence of 0.012 g of a p-toluene sulfonic acid (p-TSA) catalyst under conditions of a temperature of 110° C. and a reduced pressure of 0.1 Torr for 24 hours to prepare a poly(3-hydroxypropionate) oligomer.

A weight average molecular weight of the prepared poly (3-hydroxypropionate) oligomer was 25,000 g/mol.

(2) Preparation of poly(L-lactate-3-hydroxypropionate) Block Copolymer

In a 100 mL round flask, 100 parts by weight of L-lactide, 20 parts by weight of the poly(3-hydroxypropionate) oligomer prepared in (1), and 0.01 mol % (with respect to 100% by weight of L-lactide) of tin(II) 2-ethylhexanoate were mixed and vacuum-dried at room temperature for 4 hours by sufficiently applying a vacuum.

Thereafter, the flask was placed in an oil bath pre-heated at 130° C., the temperature of which was raised to 180° C., and then a ring-opening polymerization reaction was carried out for 90 minutes. After the reaction was completed, the reaction product was dissolved in chloroform and then extracted with methanol to recover a P(LLA-b-3HP) copolymer having a weight average molecular weight of 115,100 g/mol.

Preparation Example 1-4: Preparation of poly(L-lactate-3-hydroxypropionate) Block Copolymer A P(LLA-b-3HP) copolymer having a weight average molecular weight of 70,000 g/mol was prepared in the same manner as in Preparation Example 1-3, except that 100 parts by weight of L-lactide, 40 parts by weight of poly(3-hydroxypropionate) oligomer, and 0.01 mol % (with respect to 100% by weight of L-lactide) of tin(II) 2-ethylhexanoate were used in (2) of Preparation Example 1-3.

Preparation Example 1-5: Preparation of poly(L-lactate-3-hydroxypropionate) Bock Copolymer A P(LLA-b-3HP) copolymer having a weight average molecular weight of 30,000 g/mol was prepared in the same manner as in Preparation Example 1-3, except that 100 parts by weight of L-lactide, 70 parts by weight of poly(3-hydroxypropionate) oligomer, and 0.01 mol % (with respect to 100% by weight of L-lactide) of tin(II) 2-ethylhexanoate were used in (2) of Preparation Example 1-3.

Preparation Example 1-6: Preparation of poly(L-lactate)

In a 500 mL round flask, 25 g of L-lactide, and 11.2 μl (0.01 mol % with respect to 100% by weight of L-lactide) of tin(II) 2-ethylhexanoate were mixed and vacuum-dried at room temperature (25° C.) for 4 hours by sufficiently applying a vacuum.

Thereafter, the flask was placed in an oil bath pre-heated at 130° C., the temperature of which was raised to 180° C., and then a ring-opening polymerization reaction was carried out for 90 minutes. After the reaction was completed, the reaction product was dissolved in chloroform and then extracted with methanol to recover a PLLA polymer having a weight average molecular weight of 118,000 g/mol.

Preparation Example 2-1: Preparation of poly(D-lactate)

In a 100 mL round flask, 20 g of D-lactic acid and 6 g of p-toluenesufonic acid catalyst were mixed and allowed to react under conditions of 50 mbar and 110° C. for 3 hours and under conditions of 20 mbar and 140° C. for 15 hours to obtain a PDLA polymer having a weight average molecular weight of 14,690 g/mol.

Preparation Example 2-2: Preparation of poly(D-lactate)

In a 100 mL round flask, 10 g (70 mmol) of D-lactide, 0.036 g (0.2 mmol) of 1-octanol, and 0.01 mol % (with respect to 100% by weight of D-lactide) of tin(II) 2-ethylhexanoate were mixed and vacuum-dried at room temperature for 4 hours by sufficiently applying a vacuum.

Thereafter, the flask was placed in an oil bath pre-heated at 130° C., the temperature of which was raised to 180° C., and then a ring-opening polymerization reaction was carried out for 90 minutes. After the reaction was completed, the reaction product was dissolved in chloroform and then extracted with methanol to recover a PDLA polymer having a weight average molecular weight of 50,000 g/mol.

Preparation Example 2-3: Preparation of poly(D-lactate)

In a 100 mL round flask, 10 g (70 mmol) of D-lactide, 0.016 g (0.1 mmol) of 1-octanol, and 0.01 mol % (with respect to 100% by weight of D-lactide) of tin(II) 2-ethylhexanoate were mixed and vacuum-dried at room temperature for 4 hours by sufficiently applying a vacuum.

Thereafter, the flask was placed in an oil bath pre-heated at 130° C., the temperature of which was raised to 180° C., and then a ring-opening polymerization reaction was carried out for 90 minutes. After the reaction was completed, the reaction product was dissolved in chloroform and then extracted with methanol to recover a PDLA polymer having a weight average molecular weight of 120,000 g/mol.

Example 1

90 parts by weight of the P(LLA-b-3HP) copolymer prepared in Preparation Example 1-1 and 10 parts by weight of the PDLA polymer prepared in Preparation Example 2-1 were placed in a stirring reactor, and stirred at atmospheric pressure (760 Torr) at 200° C. for 30 minutes to prepare a polylactate stereocomplex.

Examples 2 to 6 and Comparative Examples 1 to 3

Each polylactate stereocomplex was prepared in the same manner as in Example 1, except that substances described in Table 2 below were used as P(LLA-b-3HP) (or PLLA) and PDLA, and the content of PDLA was controlled as described in Table 2 below.

Comparative Example 4

A commercially available PLLA polymer, Ingeo™ Biopolymer 2003D (PLA 2003 D) produced by Nature Works, was used as Comparative Example 2.

EXPERIMENTAL EXAMPLES

Physical properties were evaluated for the polymers prepared in Preparation Examples and the polylactate stereocomplexes of Examples and Comparative Examples by the following methods, and the results are shown in Tables 1 and 2.

Experimental Example 1: Gel Permeation Chromatography (GPC) Analysis

A weight average molecular weight (Mw) and a number average molecular weight (Mn) of each polymer were determined by gel permeation chromatography (GPC) (Waters: Waters707). A polydispersity index (PDI) was calculated by dividing the measured weight average molecular weight by the number average molecular weight.

The polymer to be measured was dissolved in chloroform to a concentration of 4000 ppm, and 100 μl thereof was injected into GPC. Chloroform was used as a mobile phase of GPC, a flow rate was 1.0 mL/min, and analysis was performed at 35° C. As a column, four Waters HR-05,1,2,4E were connected in series. RI and PAD detectors were used as detectors, and the measurement was performed at 35° C.

Experimental Example 2: Differential Scanning Calorimetry

A melting enthalpy and a melting temperature were measured using a differential scanning calorimeter (DSC, manufacturer: Mettler Toledo) by the following method.

The polymer (or stereocomplex) was heated to 230° C., and then maintained for 5 minutes, and the temperature was decreased to −40° C. to remove thermal history, and then heated to 230° C. and the melting temperature (Tm) and the melting enthalpy (ΔH) were measured from a peak of the secondary heating. At this time, the heating and cooling rates were controlled to 10° C./min, respectively.

Experimental Example 3: Measurement of Elongation

Elongation was measured for the stereocomplexes of Examples 1 to 6 and Comparative Example 1, and the P(LLA-b-3HP) copolymer of Preparation Example 1-3 by the following method.

Each dogbone-shaped test specimen corresponding to ASTM D638 Type V was prepared at 170° C. using a hot-press (Limotem QM900S) device.

The elongation was measured for the prepared specimen according to a measurement method of IPC-TM-650 using a tensile strength meter (manufacturer: Instron, model name: 3345 UTM).

TABLE 1

| | Molecular weight of P3HP | Content of P3HP*1 | Mn | Mw | PDI | Tm (° C.) | ΔH (J/g) |
|---|---|---|---|---|---|---|---|
| Preparation Example 1-1 | 10,000 | 10 | 89,600 | 124,000 | 1.4 | 171 | 22.0 |
| Preparation Example 1-2 | 10,000 | 20 | 57,300 | 80,000 | 1.4 | 169 | 31.4 |
| Preparation Example 1-3 | 25,000 | 20 | 88,200 | 115,100 | 1.3 | 162 | 33.5 |
| Preparation Example 1-4 | 25,000 | 40 | 41,000 | 70,000 | 1.7 | 159 | 29.3 |
| Preparation Example 1-5 | 25,000 | 70 | 21,000 | 30,000 | 1.4 | 153 | 19.5 |
| Preparation Example 1-6 | PLLA | | 55,140 | 118,000 | 2.1 | 172 | 34.8 |
| Preparation Example 2-1 | PDLA | | 8,700 | 14,690 | 1.6 | 156 | 46.8 |
| Preparation Example 2-2 | PDLA | | 29,800 | 50,000 | 1.7 | 162 | 27.9 |
| Preparation Example 2-3 | PDLA | | 88,300 | 120,000 | 1.4 | 169 | 34.3 |

*1parts by weight with respect to 100 parts by weight of poly(L-lactate) repeating unit

TABLE 2

| | P(LLA-b-3HP) or PLLA | PDLA (wt %)*2 | Elongation (%) | Tm (° C.) | ΔH (J/g) |
|---|---|---|---|---|---|
| Example 1 | Preparation Example 1-1 | Preparation Example 2-1 (10) | 30 | 201 | 31.7 |
| Example 2 | Preparation Example 1-2 | Preparation Example 2-1 (10) | 47 | 220 | 33.8 |
| Example 3 | Preparation Example 1-3 | Preparation Example 2-1 (10) | 92 | 205 | 21.5 |
| Example 4 | Preparation Example 1-3 | Preparation Example 2-2 (10) | 55 | 213 | 46.0 |
| Example 5 | Preparation Example 1-4 | Preparation Example 2-1 (10) | 110 | 207 | 11.1 |
| Example 6 | Preparation Example 1-4 | Preparation Example 2-1 (20) | 100 | 204 | 11.0 |
| Comparative Example 1 | Preparation Example 1-6 | Preparation Example 2-1 (10) | 1.25 | 211 | 20.5 |
| Comparative Example 2 | Preparation Example 1-5 | Preparation Example 2-1 (10) | — | 157 | 17.5 |
| Comparative Example 3 | Preparation Example 1-3 | Preparation Example 2-3 (10) | 5 | 207 | 64.0 |
| Comparative Example 4 | PLA 2003D | | 1.25 | 152 | 39.3 |
| Preparation Example 1-3 | Preparation Example 1-3 | — | 100 | 162 | 33.5 |

*2Content of PDLA in polylactate stereocomplex

Referring to Table 2, it was confirmed that the stereocomplexes of Examples 1 to 6 exhibited remarkably improved heat resistance property, as compared with the P(LLA-b-3HP) copolymer alone or the commercially available polylactate resin, and had remarkably improved tensile elongation, as compared with the stereocomplex of Comparative Example 1 prepared from poly(L-lactate) and poly (D-lactate).

Meanwhile, Comparative Example 2, in which P(LLA-b-3HP) including more than 50 parts by weight of the poly(3-hydroxypropionate) repeating unit was used, exhibited the melting temperature of lower than 200° C., indicating that the complex was not formed. Further, Comparative Example 3, in which PDLA having a weight average molecular weight of more than 100,000 g/mol was used, showed formation of the stereocomplex, but its tensile elongation characteristic was remarkably reduced, as compared with those of Examples 1 to 6.

These results suggest that when P(LLA-b-3HP) meeting the content of the poly(3-hydroxypropionate) repeating unit within the range of 10 parts by weight or more to 50 parts by weight or less and PDLA having a weight average molecular weight of 5,000 g/mol or more to less than 100,000 g/mol were used, it is possible to prepare a stereocomplex having excellent heat resistance and tensile elongation.

The invention claimed is:

1. A polylactate stereocomplex, comprising:

70 parts by weight to 90 parts by weigh of a poly(L-lactate-3-hydroxypropionate) block copolymer including 10 parts by weight to 40 parts by weight of a poly(3-hydroxypropionate) repeating unit with respect to 100 parts by weight of a poly(L-lactate) repeating unit; and 10 parts by weight to 30 parts by weight of a poly(D-lactate) having a weight average molecular weight of 10,000 g/mol or more to 50,000 g/mol or less, wherein the polylactate stereocomplex has an elongation of 30% to 150%, as measured in accordance with IPC-TM-650 using a tensile strength tester after preparing a dogbone-shaped test specimen of ASTM D638 Type V.

2. The polylactate stereocomplex of claim 1, wherein the poly(L-lactate-3-hydroxypropionate) block copolymer has a weight average molecular weight of 10,000 g/mol to 400,000 g/mol.

3. The polylactate stereocomplex of claim 1, wherein the poly(D-lactate) has a weight average molecular weight of 15,000 g/mol to 50,000 g/mol.

4. The polylactate stereocomplex of claim 1, wherein a melting temperature of the polylactate stereocomplex is 200° C. or higher.

5. The polylactate stereocomplex of claim 1, wherein a melting enthalpy of the polylactate stereocomplex is 11 J/g or more.

6. The polylactate stereocomplex of claim 1, wherein the polylactate stereocomplex has an elongation of 45% or more to 110% or less, as measured in accordance with IPC-TM-650 using a tensile strength tester after preparing a dogbone-shaped test specimen of ASTM D638 Type V.

7. A method of preparing a polylactate stereocomplex, the method comprising:

mixing (a) 70 parts by weight to 90 parts by weigh of a poly(L-lactate-3-hydroxypropionate) block copolymer including 10 parts by weight to 40 parts by weight of a poly(3-hydroxypropionate) repeating unit with respect to 100 parts by weight of a poly(L-lactate) repeating unit and (b) 10 parts by weight to 30 parts by weight of a poly(D-lactate) having a weight average molecular weight of 10,000 g/mol or more to 50,000 g/mol or less, wherein the polylactate stereocomplex has an elongation of 30% to 150%, as measured in accordance with IPC-TM-650 using a tensile strength tester after preparing a dogbone-shaped test specimen of ASTM D638 Type V.

8. The method of claim 7, wherein the poly(L-lactate-3-hydroxypropionate) block copolymer is prepared by a ring-opening polymerization of a lactide monomer in the presence of a poly(3-hydroxypropionate) initiator.

9. The method of claim 8, wherein the poly(3-hydroxypropionate) initiator has a weight average molecular weight of 1,500 g/mol to 50,000 g/mol.

10. The method of claim 8, wherein the content of the poly(3-hydroxypropionate) initiator is 10 parts by weight or more with respect to 100 parts by weight of the lactide monomer.

* * * * *